(12) United States Patent
Wu

(10) Patent No.: US 8,665,011 B2
(45) Date of Patent: Mar. 4, 2014

(54) MICRO ELECTRO-MECHANICAL SYSTEM CIRCUIT CAPABLE OF COMPENSATING CAPACITANCE VARIATION AND METHOD THEREOF

(75) Inventor: Chia-Tai Wu, Taoyuan County (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 183 days.

(21) Appl. No.: 13/291,114

(22) Filed: Nov. 8, 2011

(65) Prior Publication Data
US 2013/0049809 A1    Feb. 28, 2013

(30) Foreign Application Priority Data

Aug. 22, 2011   (TW) .............................. 100130021 A

(51) Int. Cl.
*H03B 1/00* (2006.01)
*H03K 5/00* (2006.01)
*H04B 1/10* (2006.01)

(52) U.S. Cl.
USPC ............................. 327/552; 327/551; 327/554

(58) Field of Classification Search
USPC .......................................... 327/551, 552, 554
See application file for complete search history.

(56) References Cited

U.S. PATENT DOCUMENTS 6,856,144 B2 *   2/2005   Lasalandra et al. ........... 324/661
7,454,967 B2 *   11/2008  Skurnik ....................... 73/146.5

* cited by examiner

*Primary Examiner* — John Poos
(74) *Attorney, Agent, or Firm* — Winston Hsu; Scott Margo

(57) ABSTRACT

A micro electro-mechanical system (MEMS) circuit includes a MEMS differential capacitor, a read-out circuit, a control circuit, and a compensation circuit. The MEMS differential capacitor includes a first capacitor and a second capacitor. The read-out circuit is coupled to the MEMS differential capacitor for reading a difference between the first capacitor and the second capacitor in a zero-G condition, and generating an output signal according to the difference. The control circuit is coupled to the read-out circuit for receiving the output signal and generating a control signal. The compensation circuit is coupled to the control circuit for compensating the MEMS differential capacitor according to the control signal.

15 Claims, 4 Drawing Sheets

MICRO ELECTRO-MECHANICAL SYSTEM CIRCUIT CAPABLE OF COMPENSATING CAPACITANCE VARIATION AND METHOD THEREOF

BACKGROUND OF THE INVENTION

1. Field of the Invention

The present invention is related to a micro electro-mechanical system circuit capable of compensating capacitance variation and method thereof, and particularly to a micro electro-mechanical system (MEMS) circuit capable of compensating capacitance variation and method thereof that can utilize a compensation circuit to compensate the capacitance variation.

2. Description of the Prior Art

In the prior art, an accelerometer has zero-G shift because of capacitance variation caused by process variation of a MEMS differential capacitor and a read-out circuit included by the accelerometer, resulting in a sensor which includes the accelerometer with the zero-G shift generating a sensing result error.

Because a designer of an accelerometer can not prevent an accelerometer from having zero-G shift, an importance issue for accelerometer designers becomes how to design an accelerometer that does not suffer from process variation of a MEMS differential capacitor and a read-out circuit.

SUMMARY OF THE INVENTION

An embodiment provides a micro electro-mechanical system (MEMS) circuit capable of compensating capacitance variation. The MEMS circuit includes a MEMS differential capacitor, a read-out circuit, a control circuit, and a compensation circuit. The MEMS differential capacitor includes a first capacitor and a second capacitor. The read-out circuit is coupled to the MEMS differential capacitor for reading a difference between the first capacitor and the second capacitor in a zero-G condition, and generating an output signal according to the difference. The control circuit is coupled to the read-out circuit for receiving the output signal, and generating a control signal. The compensation circuit is coupled to the control circuit for compensating the MEMS differential capacitor according to the control signal.

Another embodiment provides a method of compensating capacitance variation of a MEMS circuit. The method includes reading a difference between a first capacitor and a second capacitor of a MEMS differential capacitor in a zero-G condition; generating an output signal according to the difference; receiving the output signal and generating a control signal; and compensating the MEMS differential capacitor according to the control signal.

The present invention provides a MEMS circuit capable of compensating capacitance variation and a method of compensating capacitance variation of a MEMS circuit. The MEMS circuit and the method utilize a read-out circuit to read a difference between a first capacitor and a second capacitor of a MEMS differential capacitor in a zero-G condition and generate an output signal. Then a control circuit can generate a control signal according to a lookup table and the output signal. A compensation circuit can compensate the MEMS differential capacitor according to the control signal. In addition, the MEMS differential capacitor is further isolated from the compensation circuit by turning-off of a first coupling switch and turning-on of a second coupling switch. Because the present invention can utilize the compensation circuit to compensate capacitance variation caused by process variations of the MEMS differential capacitor and the read-out circuit, the present invention can prevent the read-out circuit from generating an output signal error due to zero-G shift of the MEMS circuit caused by the capacitance variation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
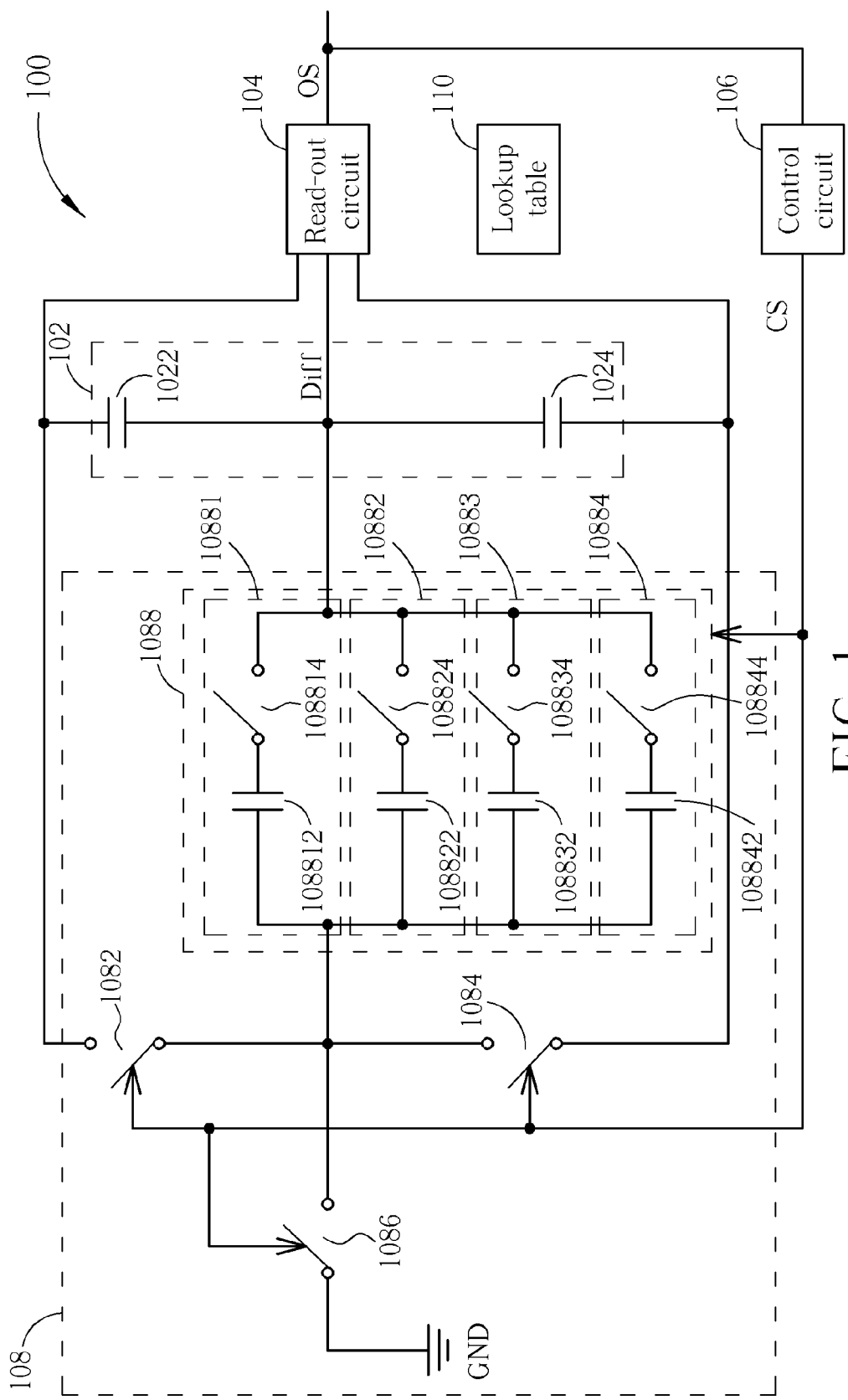
FIG. 1 is a diagram illustrating a micro electro-mechanical system circuit capable of compensating capacitance variation according to an embodiment.

Please refer to FIG. 1. FIG. 1 is a diagram illustrating a micro electro-mechanical system (MEMS) circuit 100 capable of compensating capacitance variation according to an embodiment. The MEMS circuit 100 includes a MEMS differential capacitor 102, a read-out circuit 104, a control circuit 106, and a compensation circuit 108. The MEMS differential capacitor 102 includes a first capacitor 1022 and a second capacitor 1024, where the first capacitor 1022 is the same as the second capacitor 1024 or the first capacitor 1022 is different from the second capacitor 1024 in a zero-G condition. The read-out circuit 104 is coupled to the MEMS differential capacitor 102 for reading a difference Diff between the first capacitor 1022 and the second capacitor 1024 in the zero-G condition, and generating an output signal OS according to the difference Diff. The control circuit 106 is coupled to the read-out circuit 104 for receiving the output signal OS, and generating a control signal CS according to a lookup table 110 further included by the MEMS circuit 100 and the output signal OS, where the control signal CS is a 4-bit signal. But, the 4-bit control signal CS is only used for describing the present invention, so the present invention is not limited to the control signal CS being the 4-bit signal. The compensation circuit 108 is coupled to the control circuit 106 for compensating the MEMS differential capacitor 102 according to the control signal CS.

As shown in FIG. 1, the first capacitor 1022 has a first terminal coupled to the read-out circuit 104, and a second terminal coupled to the read-out circuit 104. The second capacitor 1024 has a first terminal coupled to the second terminal of the first capacitor 1022, and a second terminal coupled to the read-out circuit 104.

As shown in FIG. 1, the compensation circuit 108 includes a first switch 1082, a second switch 1084, a third switch 1086, and a variable capacitor 1088. The first switch 1082 has a first terminal coupled to the first terminal of the first capacitor 1022, a second terminal for receiving the control signal CS, and a third terminal. The second switch 1084 has a first terminal coupled to the third terminal of the first switch 1082, a second terminal for receiving the control signal CS, and a third terminal coupled to the second terminal of the second capacitor 1024. The third switch 1086 has a first terminal coupled to the third terminal of the first switch 1082, a second terminal for receiving the control signal CS, and a third terminal coupled to ground GND. The variable capacitor 1088 is coupled between the third terminal of the first switch 1082 and the second terminal of the first capacitor 1022, where the variable capacitor 1088 changes a capacitance value of the variable capacitor 1088 to compensate the MEMS differential capacitor 102 according to the control signal CS. As shown in FIG. 1, the variable capacitor 1088 includes 4 capacitor units 10881 to 10884. Each capacitor unit 1088$i$ includes a capacitor 1088$i$2 and a switch 1088$i$4, where 0≤i≤4, and i is a positive integer. The capacitor unit 1088$i$ has a first terminal coupled to the third terminal of the first switch 1082, and a second terminal. The switch 1088$i$4 has a first terminal coupled to the second terminal of the capacitor 1088$i$2, a second terminal for receiving the control signal CS, and a third terminal coupled to the second terminal of the first capacitor 1022. For example, the capacitor unit 10881 includes a capacitor 108812 and a switch 108814. The capacitor 108812 has a first terminal coupled to the third terminal of the first switch 1082, and a second terminal. The switch 108814 has a first terminal coupled to the second terminal of the capacitor 108812, a second terminal for receiving the control signal CS, and a third terminal coupled to the second terminal of the first capacitor 1022. But, the 4 capacitor units 10881 to 10884 are only used for describing the present invention, and the present invention is not limited to the 4 capacitor units 10881 to 10884. In addition, in another embodiment of the present invention, the first terminal of the switch 1088$i$4 is coupled to the third terminal of the first switch 1082; the first terminal of the capacitor 1088$i$2 is coupled to the third terminal of the switch 1088$i$4, and the second terminal of the capacitor 1088$i$2 is coupled to the second terminal of the first capacitor 1022.

As shown in FIG. 1, when the difference Diff between the first capacitor 1022 and the second capacitor 1024 in the zero-G condition is equal to a predetermined value (the MEMS circuit 100 does not have zero-G shift), the read-out circuit 104 generates the output signal OS according to the difference Diff. The control circuit 106 can generate the control signal CS according to the output signal OS and the lookup table 110. The first switch 1082 and the second switch 1084 of the compensation circuit 108 are turned off according to the control signal CS, and the third switch 1086 is turned on according to the control signal CS. Because the third switch 1086 is turned on, first terminals of the capacitors 108812 to 108842 of the variable capacitor 1088 are coupled to the ground GND. That is to say, the variable capacitor 1088 is regarded as a parasitic capacitor of the read-out circuit 104, and does not compensate the first capacitor 1022 and the second capacitor 1024. In addition, if the first capacitor 1022 is the same as the second capacitor 1024, the predetermined value is zero; if the first capacitor 1022 is different from the second capacitor 1024, the predetermined value is a constant value, such as 10 fF. But, the present invention is not limited to the predetermined value being 10 fF.

When the difference Diff between the first capacitor 1022 and the second capacitor 1024 in the zero-G condition is greater than the predetermined value (the MEMS circuit 100 has the zero-G shift), the read-out circuit 104 generates the output signal OS according to the difference Diff. The control circuit 106 can generate the control signal CS according to the output signal OS and the lookup table 110. The first switch 1082 and the third switch 1086 of the compensation circuit 108 are turned off according to the control signal CS, and the second switch 1084 is turned on according to the control signal CS. Because the second switch 1084 is turned on, the variable capacitor 1088 is parallel to the second capacitor 1024. That is to say, the variable capacitor 1088 compensates the second capacitor 1024.

When the difference Diff between the first capacitor 1022 and the second capacitor 1024 in the zero-G condition is less than the predetermined value (the MEMS circuit 100 has the zero-G shift), the read-out circuit 104 generates the output signal OS according to the difference Diff. The control circuit 106 can generate the control signal CS according to the output signal OS and the lookup table 110. The second switch 1084 and the third switch 1086 of the compensation circuit 108 are turned off according to the control signal CS, and the first switch 1082 is turned on according to the control signal CS. Because the first switch 1082 is turned on, the variable capacitor 1088 is parallel to the first capacitor 1022. That is to say, the variable capacitor 1088 compensates the first capacitor 1022.

But, the present invention is not limited to the MEMS circuit 100 utilizing the variable capacitor 1088 to compensate the second capacitor 1024 when the difference Diff between the first capacitor 1022 and the second capacitor 1024 in the zero-G condition is greater than the predetermined value, and the MEMS circuit 100 utilizing the variable capacitor 1088 to compensate the first capacitor 1022 when the difference Diff between the first capacitor 1022 and the second capacitor 1024 in the zero-G condition is less than the predetermined value. That is to say, in another embodiment of the present invention, the MEMS circuit 100 utilizes the variable capacitor 1088 to compensate the second capacitor 1024 when the difference Diff between the first capacitor 1022 and the second capacitor 1024 in the zero-G condition is less than the predetermined value, and the MEMS circuit 100 utilizes the variable capacitor 1088 to compensate the first capacitor 1022 when the difference Diff between the first capacitor 1022 and the second capacitor 1024 in the zero-G condition is greater than the predetermined value.

After the MEMS differential capacitor 102 is compensated, when a user moves the MEMS circuit 100, the first capacitor 1022 can change a capacitance value of the first capacitor 1022 according to displacement of a first mass comprised by the first capacitor 1022, and the second capacitor 1024 can change a capacitance value of the second capacitor 1024 according to displacement of a second mass comprised by the second capacitor 1024. Therefore, the read-out circuit 104 can generate a new output signal to an accelerometer according to a new difference between the first capacitor 1022 and the second capacitor 1024.

Figure 2:
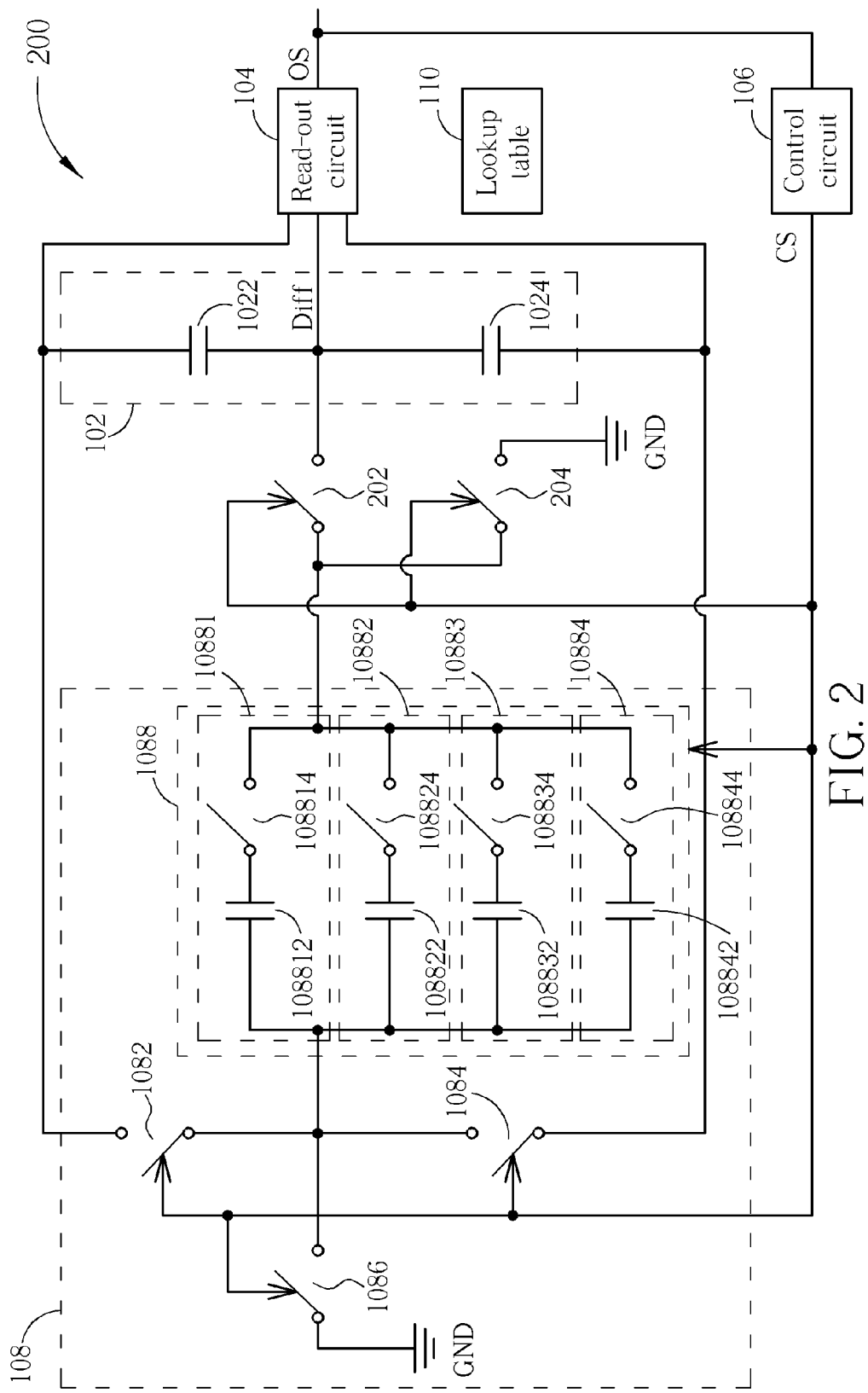
FIG. 2 is a diagram illustrating a MEMS circuit capable of compensating capacitance variation according to another embodiment.

Please refer to FIG. 2. FIG. 2 is a diagram illustrating a MEMS circuit 200 capable of compensating capacitance variation according to another embodiment. A difference between the MEMS circuit 200 and the MEMS circuit 100 is that the MEMS circuit 200 further includes a first coupling switch 202 and a second coupling switch 204. The first coupling switch 202 has a first terminal coupled to the compensation circuit 108, a second terminal for receiving the control signal CS, and a third terminal coupled to the second terminal of the first capacitor 1022. The second coupling switch 204 has a first terminal coupled to the compensation circuit 108, a second terminal for receiving the control signal CS, and a third terminal coupled to the ground GND.

As shown in FIG. 2, the variable capacitor 1088 is coupled between the third terminal of the first switch 1082 and the first terminal of the first coupling switch 202, where the variable capacitor 1088 changes a capacitance value of the variable capacitor 1088 to compensate the MEMS differential capacitor 102 according to the control signal CS. As shown in FIG.

2, the variable capacitor 1088 includes the 4 capacitor units 10881 to 10884. Each capacitor unit 1088$i$ includes a capacitor 1088$i$2 and a switch 1088$i$4. The capacitor 1088$i$2 has a first terminal coupled to the third terminal of the first switch 1082, and a second terminal. The switch 1088$i$4 has a first terminal coupled to the second terminal of the capacitor 1088$i$2, a second terminal for receiving the control signal CS, and a third terminal coupled to the first terminal of the first coupling switch 202, where 0≤$i$≤4, and $i$ is a positive integer. But, the 4 capacitor units 10881 to 10884 are only used for describing the present invention, and the present invention is not limited to the 4 capacitor units 10881 to 10884. In addition, in another embodiment of the present invention, the first terminal of the switch 1088$i$4 is coupled to the third terminal of the first switch 1082; the first terminal of the capacitor 1088$i$2 is coupled to the third terminal of the switch 1088$i$4, and the second terminal of the capacitor 1088$i$2 is coupled to the first terminal of the first coupling switch 202.

As shown in FIG. 2, when the difference Diff between the first capacitor 1022 and the second capacitor 1024 in the zero-G condition is equal to a predetermined value (the MEMS circuit 100 does not have zero-G shift), the read-out circuit 104 generates the output signal OS according to the difference Diff. The control circuit 106 can generate the control signal CS according to the output signal OS and the lookup table 110. The first switch 1082, the second switch 1084, and the first coupling switch 202 of the compensation circuit 108 are turned off according to the control signal CS, and the third switch 1086 and the second coupling switch 204 are turned on according to the control signal CS. Because the second coupling switch 204 is turned on, the variable capacitor 1088 is coupled to the ground GND through the second coupling switch 204, and not coupled to the MEMS differential capacitor 102.

When the difference Diff between the first capacitor 1022 and the second capacitor 1024 in the zero-G condition is greater than the predetermined value (the MEMS circuit 100 has the zero-G shift), the read-out circuit 104 generates the output signal OS according to the difference Diff. The control circuit 106 can generate the control signal CS according to the output signal OS and the lookup table 110. The first switch 1082, the third switch 1086, and the second coupling switch 204 of the compensation circuit 108 are turned off according to the control signal CS, and the second switch 1084 and the first coupling switch 202 are turned on according to the control signal CS. Because the second switch 1084 and the first coupling switch 202 are turned on, the variable capacitor 1088 is parallel to the second capacitor 1024. That is to say, the variable capacitor 1088 compensates the second capacitor 1024.

When the difference Diff between the first capacitor 1022 and the second capacitor 1024 in the zero-G condition is less than the predetermined value (the MEMS circuit 100 has the zero-G shift), the read-out circuit 104 generates the output signal OS according to the difference Diff. The control circuit 106 can generate the control signal CS according to the output signal OS and the lookup table 110. The second switch 1084, the third switch 1086, and the second coupling switch 204 of the compensation circuit 108 are turned off according to the control signal CS, and the first switch 1082 and the first coupling switch 202 are turned on according to the control signal CS. Because the first switch 1082 and the first coupling switch 202 are turned on, the variable capacitor 1088 is parallel to the first capacitor 1022. That is to say, the variable capacitor 1088 compensates the first capacitor 1022.

Further, subsequent operational principles of the MEMS circuit 200 are the same as those of the MEMS circuit 100, so further description thereof is omitted for simplicity.

Figure 3:
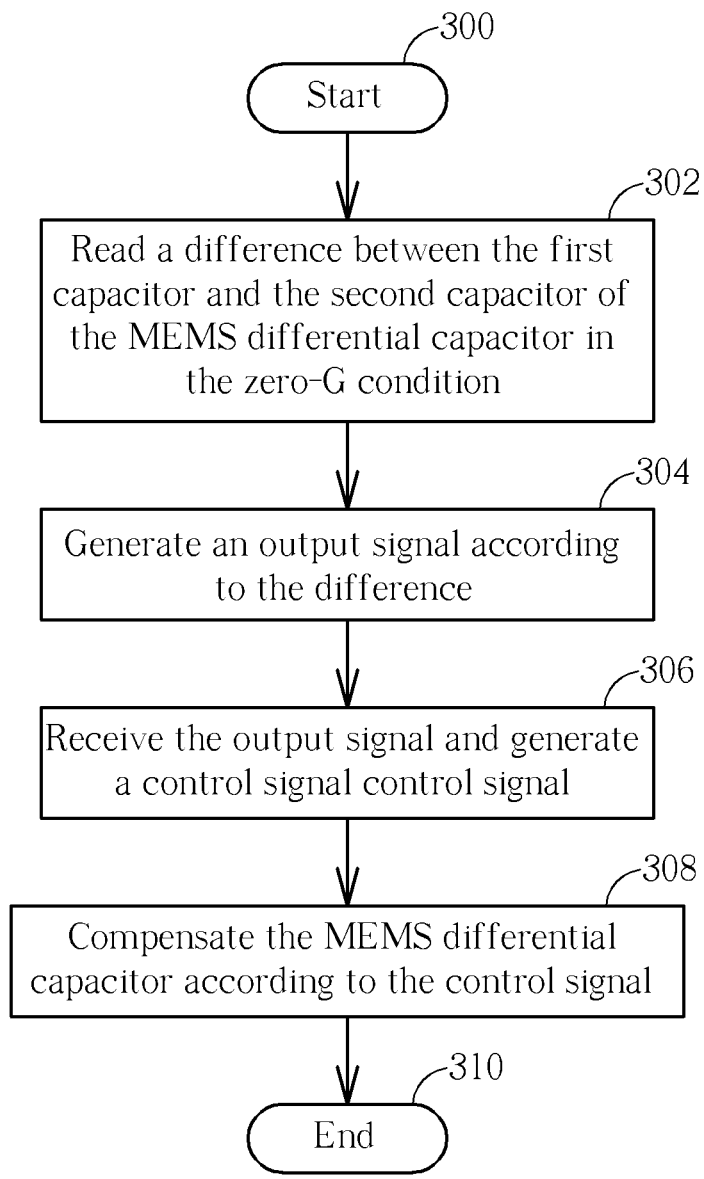
FIG. 3 is a flowchart illustrating a method of compensating capacitance variation of a MEMS circuit according to another embodiment.

Please refer to FIG. 3. FIG. 3 is a flowchart illustrating a method of compensating capacitance variation of a MEMS circuit according to another embodiment. The method in FIG. 3 is illustrated using the MEMS circuit 100 in FIG. 1. Detailed steps are as follows:

Step 300: Start.
Step 302: Read a difference Diff between the first capacitor 1022 and the second capacitor 1024 of the MEMS differential capacitor 102 in the zero-G condition.
Step 304: Generate an output signal OS according to the difference Diff.
Step 306: Receive the output signal OS and generate a control signal control signal CS.
Step 308: Compensate the MEMS differential capacitor 102 according to the control signal CS.
Step 310: End.

In Step 302 and Step 304, the read-out circuit 104 reads the difference Diff between the first capacitor 1022 and the second capacitor 1024 in the zero-G condition, and generates the output signal OS according to the difference Diff. In Step 306, the control circuit 106 generates the control signal CS according to the lookup table 110 and the output signal OS after the control circuit 106 receives the output signal OS, where the control signal CS is a 4-bit signal. But, the present invention is not limited to the control signal CS being the 4-bit signal. In Step 308, when the difference Diff between the first capacitor 1022 and the second capacitor 1024 in the zero-G condition is equal to the predetermined value, the first switch 1082 and the second switch 1084 of the compensation circuit 108 are turned off according to the control signal CS, and the third switch 1086 is turned on according to the control signal CS. Therefore, the variable capacitor 1088 is regarded as a parasitic capacitor of the read-out circuit 104, and the variable capacitor 1088 does not compensate the first capacitor 1022 and the second capacitor 1024. In addition, if the first capacitor 1022 is the same as the second capacitor 1024, the predetermined value is zero; if the first capacitor 1022 is different from the second capacitor 1024, the predetermined value is a constant value. When the difference Diff between the first capacitor 1022 and the second capacitor 1024 in the zero-G condition is greater than the predetermined value, the first switch 1082 and the third switch 1086 of the compensation circuit 108 are turned off according to the control signal CS, and the second switch 1084 is turned on according to the control signal CS. Because the second switch 1084 is turned on, the variable capacitor 1088 can compensate the second capacitor 1024. When the difference Diff between the first capacitor 1022 and the second capacitor 1024 in the zero-G condition is less than the predetermined value, the second switch 1084 and the third switch 1086 of the compensation circuit 108 are turned off according to the control signal CS, and the first switch 1082 is turned on according to the control signal CS. Because the first switch 1082 is turned on, the variable capacitor 1088 can compensate the first capacitor 1022.

Figure 4:
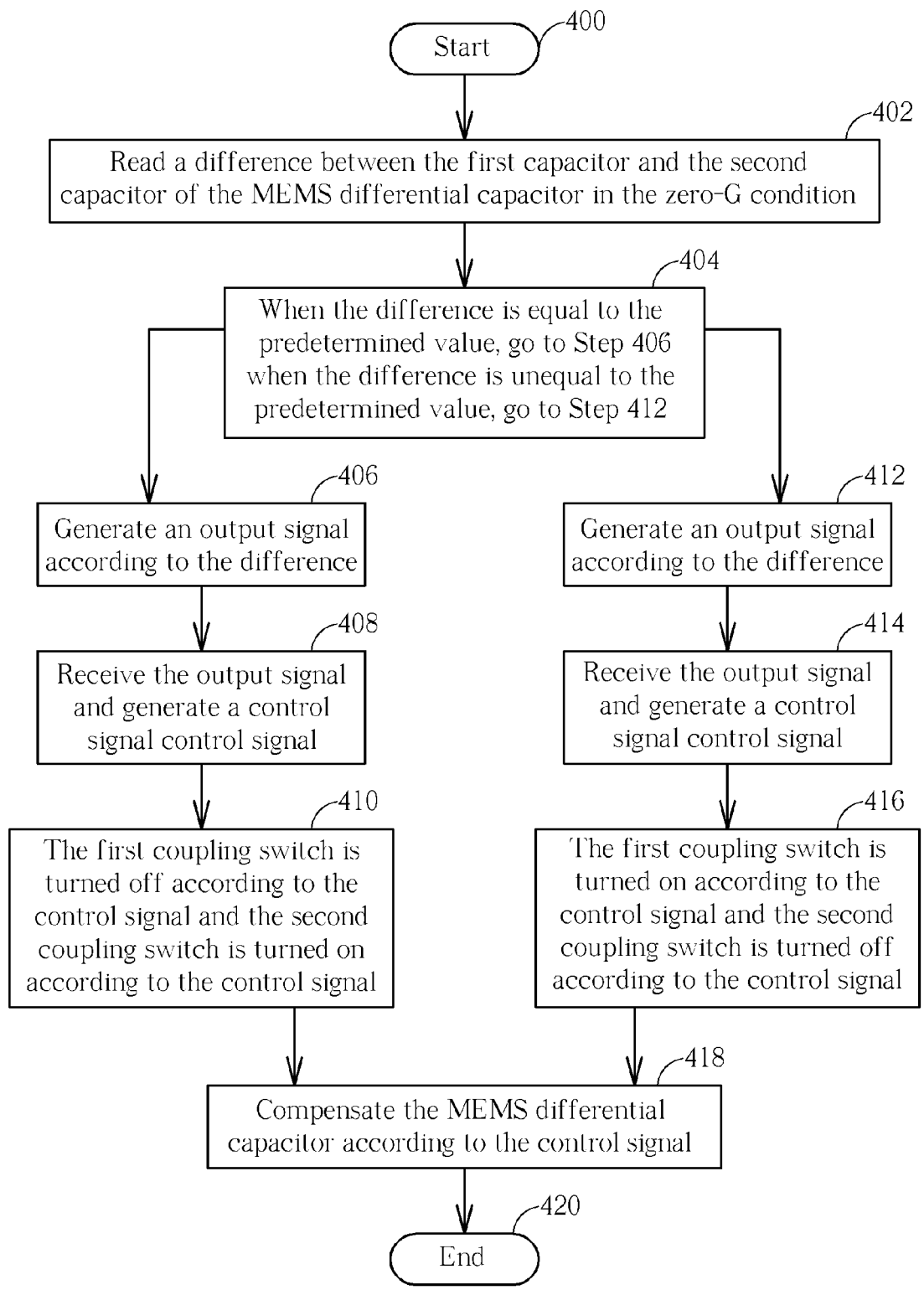
FIG. 4 is a flowchart illustrating a method of compensating capacitance variation of a MEMS circuit according to another embodiment.

Please refer to FIG. 4. FIG. 4 is a flowchart illustrating a method of compensating capacitance variation of a MEMS circuit according to another embodiment. The method in FIG. 4 is illustrated using the MEMS circuit 200 in FIG. 2. Detailed steps are as follows:

Step 400: Start.
Step 402: Read a difference Diff between the first capacitor 1022 and the second capacitor 1024 of the MEMS differential capacitor 102 in the zero-G condition.

Step 404: When the difference Diff is equal to the predetermined value, go to Step 406; when the difference Diff is unequal to the predetermined value, go to Step 412.

Step 406: Generate an output signal OS according to the difference Diff.

Step 408: Receive the output signal OS and generate a control signal control signal CS.

Step 410: The first coupling switch 202 is turned off according to the control signal CS and the second coupling switch 204 is turned on according to the control signal CS; go to Step 418.

Step 412: Generate an output signal OS according to the difference Diff.

Step 414: Receive the output signal OS and generate a control signal control signal CS.

Step 416: The first coupling switch 202 is turned on according to the control signal CS and the second coupling switch 204 is turned off according to the control signal CS; go to Step 418.

Step 418: Compensate the MEMS differential capacitor 102 according to the control signal CS.

Step 420: End.

A difference between the embodiment in FIG. 4 and the embodiment in FIG. 3 is that when the difference Diff is equal to the predetermined value, the method performs Step 406 through Step 410. That is to say, because the first coupling switch 202 is turned off according to the control signal CS and the second coupling switch 204 is turned on according to the control signal CS, the variable capacitor 1088 is coupled to the ground GND through the second coupling switch 204, and not coupled to the MEMS differential capacitor 102. When the difference Diff is unequal to the predetermined value, the method performs Step 412 through Step 416. That is to say, because the first coupling switch 202 is turned on according to the control signal CS and the second coupling switch 204 is turned off according to the control signal CS, the variable capacitor 1088 can compensate the first capacitor 1022 or the second capacitor 1024 according to the control signal CS.

To sum up, the MEMS circuit capable of compensating the capacitance variation and the method of compensating the capacitance variation of the MEMS circuit utilize the read-out circuit to read a difference between the first capacitor and the second capacitor in the zero-G condition, and generate an output signal. Then, the control circuit can generate a control signal according to the lookup table and the output signal. The compensation circuit can compensate the MEMS differential capacitor according to the control signal. In addition, the MEMS differential capacitor is further isolated from the compensation circuit by turning-off of the first coupling switch and turning-on of the second coupling switch. Because the present invention can utilize the compensation circuit to compensate the capacitance variation caused by process variation of the MEMS differential capacitor and the read-out circuit, the present invention can prevent the read-out circuit from generating an output signal error due to the zero-G shift of the MEMS circuit caused by the capacitance variation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A micro electro-mechanical system (MEMS) circuit capable of compensating capacitance variation, the MEMS circuit comprising:
   a MEMS differential capacitor comprising a first capacitor and a second capacitor;
   a read-out circuit coupled to the MEMS differential capacitor for reading a difference between the first capacitor and the second capacitor in a zero-G condition, and generating an output signal according to the difference;
   a control circuit coupled to the read-out circuit for receiving the output signal, and generating a control signal; and
   a compensation circuit coupled to the control circuit for compensating the MEMS differential capacitor according to the control signal, wherein the compensation circuit comprises:
      a first switch having a first terminal coupled to a first terminal of the first capacitor, a second terminal for receiving the control signal, and a third terminal;
      a second switch having a first terminal coupled to the third terminal of the first switch, a second terminal for receiving the control signal, and a third terminal coupled to a second terminal of the second capacitor;
      a third switch having a first terminal coupled to the third terminal of the first switch, a second terminal for receiving the control signal, and a third terminal coupled to ground; and
      a variable capacitor coupled between the third terminal of the first switch and a second terminal of the first capacitor, wherein the variable capacitor changes a capacitance value of the variable capacitor to compensate the MEMS differential capacitor according to the control signal.

2. The MEMS circuit of claim 1, wherein a capacitance of the first capacitor is the same as a capacitance of the second capacitor.

3. The MEMS circuit of claim 1, wherein a capacitance of the first capacitor is different from a capacitance of the second capacitor.

4. The MEMS circuit of claim 1, further comprising:
   a lookup table, wherein the control circuit generates the control signal according to the lookup table and the output signal.

5. The MEMS circuit of claim 1, wherein the first capacitor changes a capacitance value of the first capacitor according to displacement of first mass comprised by the first capacitor; and the second capacitor changes a capacitance value of the second capacitor according to displacement of second mass comprised by the second capacitor.

6. The MEMS circuit of claim 1, wherein the first capacitor has a first terminal coupled to the read-out circuit, and a second terminal coupled to the read-out circuit; and the second capacitor has a first terminal coupled to the second terminal of the first capacitor, and a second terminal coupled to the read-out circuit.

7. The MEMS circuit of claim 1, wherein the variable capacitor comprises N capacitor units, and each capacitor unit comprises:
   a capacitor having a first terminal coupled to the third terminal of the first switch, and a second terminal coupled to the second terminal of the first capacitor; and
   a switch having a first terminal coupled to the third terminal of the first switch, a second terminal for receiving the control signal, and a third terminal coupled to the second terminal of the first capacitor; wherein the switch is coupled to the capacitor in a series manner.

8. The MEMS circuit of claim 7, wherein the control signal is an N-bit signal, and N is a positive integer.

9. The MEMS circuit of claim 1, further comprising:
   a first coupling switch having a first terminal coupled to the compensation circuit, a second terminal for receiving the control signal, and a third terminal coupled to the second terminal of the first capacitor; and a second coupling switch having a first terminal coupled to the compensation circuit, a second terminal for receiving the control signal, and a third terminal coupled to ground;

wherein the first coupling switch is turned on according to the control signal and the second coupling switch is turned off according to the control signal when the difference is unequal to a predetermined value; and the first coupling switch is turned off according to the control signal and the second coupling switch is turned on according to the control signal when the difference is equal to the predetermined value.

10. A method of compensating capacitance variation of a MEMS circuit, the method comprising:

reading a difference between a first capacitor and a second capacitor of a MEMS differential capacitor in a zero-G condition;

generating an output signal according to the difference;

receiving the output signal and generating a control signal; and changing a capacitance value of a variable capacitor to compensate the MEMS differential capacitor according to the control signal.

11. The method of claim 10, wherein receiving the output signal and generating the control signal is generating the control signal according to a lookup table and the output signal after receiving the output signal.

12. The method of claim 10, further comprising:

a first coupling switch and a second coupling switch performing corresponding operations according to the control signal.

13. The method of claim 12, wherein the first coupling switch is turned on according to the control signal and the second coupling switch is turned off according to the control signal when the difference is unequal to a predetermined value.

14. The method of claim 12, wherein the first coupling switch is turned off according to the control signal and the second coupling switch is turned on according to the control signal when the difference is equal to the predetermined value.

15. The method of claim 10, wherein the control signal is an N-bit signal, and N is a positive integer.

* * * * *